US008800277B2

(12) United States Patent
Morvan et al.

(10) Patent No.: US 8,800,277 B2
(45) Date of Patent: Aug. 12, 2014

(54) HYDRAULIC SYSTEM FOR AIRCRAFT

(75) Inventors: Roger Morvan, Gratentour (FR); Nicolas Dubois, La Salvetat Saint Gilles (FR); Cedric Lonjon, Lherm (FR)

(73) Assignee: Airbus Operations SAS, Toulouse (FR)

( * ) Notice: Subject to any disclaimer, the term of this patent is extended or adjusted under 35 U.S.C. 154(b) by 1146 days.

(21) Appl. No.: 12/739,275

(22) PCT Filed: Oct. 22, 2008

(86) PCT No.: PCT/FR2008/051905

§ 371 (c)(1), (2), (4) Date: Nov. 30, 2010

(87) PCT Pub. No.: WO2009/056733

PCT Pub. Date: May 7, 2009

(65) Prior Publication Data

US 2011/0088383 A1 Apr. 21, 2011

(30) Foreign Application Priority Data

Oct. 23, 2007 (FR) ..................................... 07 58480

(51) Int. Cl.
*F16D 31/02* (2006.01)
*B64C 3/38* (2006.01)

(52) U.S. Cl.
USPC .......... 60/403; 244/99.4; 244/99.5; 244/99.6; 244/99.9

(58) Field of Classification Search
USPC ........... 60/403, 404, 405, 406, 378; 244/99.4, 244/99.5, 99.6, 117 R, 99.7, 99.9, 78.1, 52, 244/226, 227
See application file for complete search history.

(56) References Cited

U.S. PATENT DOCUMENTS

| | | | | |
|---|---|---|---|---|
| 4,428,196 | A | 1/1984 | Boehringer | |
| 4,704,865 | A | 11/1987 | Archung | |
| 4,823,552 | A * | 4/1989 | Ezell et al. | 60/443 |
| 5,100,082 | A * | 3/1992 | Archung | 244/78.1 |
| 5,873,548 | A * | 2/1999 | Huling | 244/78.1 |
| 6,502,042 | B1 * | 12/2002 | Eid et al. | 702/50 |
| 7,191,593 | B1 | 3/2007 | Ho | |

OTHER PUBLICATIONS

Walters, M.J. "Engine-Driven Hydraulic Pumps". 1983. Lockheed Service News. vol. 10, No. 2, Apr.-Jun. 1983. pp. 1-9.*
Airbus Training. "Hydarulic". Flight Crew Operating Manual. 2006.*
International Search Report dated Apr. 22, 2009.

* cited by examiner

*Primary Examiner* — Edward Look
*Assistant Examiner* — Michael Quandt
(74) *Attorney, Agent, or Firm* — Greer, Burns & Crain, Ltd.

(57) ABSTRACT

A hydraulic system for aircraft wherein at least one circuit includes two hydraulic pumps, at least one of which is driven by an engine that may suffer uncontained failure that can damage hydraulic lines close to the pump, is equipped with pressure sensors for the hydraulic fluid in the lines close to the pump and a sensor for the hydraulic fluid level in a hydraulic tank of the circuit supplied by the pump. A control system for a cut-out valve installed on a suction line wherein the fluid arrives at the pump includes logic that determines the occurrence of an uncontained engine failure requiring the isolation of the pumps from line elements that may have been damaged from measurements of the fluid pressures in the lines, from measurement of the level of fluid in the tank and from information supplied late by a uncontained engine failure detection system to command the closure of the cut-out valve. The disclosed embodiments allow achieving a simplified hydraulic architecture wherein two independent circuits are supplied by two pumps each mounted on propulsion engines.

17 Claims, 2 Drawing Sheets

HYDRAULIC SYSTEM FOR AIRCRAFT

CROSS-REFERENCE TO RELATED APPLICATIONS

This application is the National Stage of International Application No. PCT/FR2008/051905 International Filing Date, 22 Oct. 2008, which designated the United States of America, and which International Application was published under PCT Article 21 (s) as WO Publication No. WO2009/056733 A1 and which claims priority from, and the benefit, of French Application No. 200758480 filed on 23 Oct. 2007, the disclosures of which are incorporated herein by reference in their entireties.

The aspects of the disclosed embodiments belong to the domain of hydraulic systems used onboard aircraft to control moving elements such as aerodynamic control surfaces and parts of the landing gear.

More specifically, the disclosed embodiments relate to protection for such hydraulic systems that limits the consequences of certain lines rupturing close to the hydraulic pressure pumps in cases of uncontained engine failure.

BACKGROUND

On the majority of modern transport aircraft many moving parts are moved by actuators using power transmitted in hydraulic fluid under pressure.

Aerodynamic control surfaces and the mobile parts of landing gears are the main elements moved by hydraulic actuators and their correct operation is vital since any uncontained failure can put the aircraft at risk.

For these safety reasons, aircraft hydraulic systems, comprising hydraulic generators, hydraulic distributors and actuators, are laid out according to architectures that attempt to limit the consequences of possible failures in said systems and in any event to prevent a likely failure from causing consequences that could jeopardize the affected aircraft's integrity.

Many different architectures have been devised and or implemented on aircraft to limit the consequences of hydraulic system component failures.

There are principles common to all known architectures, at least for those used onboard civilian aircraft that must comply with strict certification regulations, consisting of installing several independent hydraulic circuits, two or three circuits in general, each circuit possibly comprising certain components two or several times, for instance two hydraulic pumps (redundancy rules) and, further, to lay out said circuits on board the aircraft such that the risk of a single damage triggering event damaging two or several redundant circuits or components is improbable (segregation rule).

In order to implement these basic hydraulic systems safety principles some hydraulic circuits are fitted with at least two hydraulic pressure generators, hydraulic pumps, driven by separate engines, e.g. a propulsion engine on the left wing of a plane and a propulsion engine on the right wing (or an electric motor, or a wind turbine or an auxiliary power unit)

In this type of hydraulic circuit, it is required that the failure of one generation source in the circuit does not make the circuit unusable thus making the second generation source for this same circuit useless. In the opposite case the pump redundancy would then be apparent and would not meet the stated objective.

A significant risk for a hydraulic circuit whose hydraulic power generation uses a hydraulic pump driven by a propulsion engine of the turbojet or turboshaft turbine type comes from debris that may be thrown during the uncontained failure of a rotating part of said turbine, an event referred to as uncontained engine failure.

Hydraulic pumps mechanically driven by the propulsion engines are of necessity located close to said engines and in general it is not possible to have the hydraulic lines connected to said pumps installed outside the sensitive areas that may be reached by debris caused by uncontained engine failure of an engine.

Should such an event occur, there is a high risk that a hydraulic line will be severely damaged or even severed and that, absent specific measures, the affected hydraulic circuit will lose hydraulic fluid quickly and become unusable.

To avoid the loss of all the hydraulic fluid in the event of a broken line during an uncontained engine failure, an apparatus specific to the engine, e.g. an engine control unit that includes monitoring functions, that analyses engine operating parameters that may allow detection of uncontained engine failure issues a specific alert to signal uncontained failure of the affected engine, said alert being used to control the closure of cut-out valves mounted on the hydraulic lines and causing the hydraulic circuit to be isolated from the uncontained failure area in which a line may have been severed.

One problem with this type of apparatus comes from the fact that most often, the means of detecting an uncontained engine failure cannot issue the corresponding signal before a long period, of the order of 30 seconds, in regards to the hydraulic leak occasioned by a severed pump line.

To activate the cut-out valve or valves that isolate the hydraulic circuit from the pumps driven by the failing engine before all the hydraulic fluid is lost, it is necessary to have a large-capacity fluid reserve tank, a solution that is generally dismissed because of the mass that results from such a solution.

It is also feasible to implement other means of detection e.g. wires to be broken associated with the hydraulic lines that allow rapid detection of a severed line by breaking in case of rupture of the lines.

These solutions however are also not completely satisfactory because of the fragility of the wires to be broken that work, in the case of hydraulic lines close to propulsion engines, in a harsh environment that does not always allow detection of all the possible engine debris trajectories.

In the end, the necessity of taking into consideration the case of uncontained engine failure and damaged hydraulic lines close to the pump or pumps associated to that engine leads to complicated and burdensome hydraulic generation systems architectures, in particular by placing hydraulic circuits entirely outside the uncontained engine failure debris projection areas which in turn imposes the use of pumps driven by means other than the propulsion engines, e.g. electric motors or wind turbines etc.

SUMMARY

To simplify aircraft hydraulic systems architecture, the disclosed embodiments propose a hydraulic system comprising at least one hydraulic circuit powered by at least two pumps and in which amongst the hydraulic circuit pumps:

- at least one pump is driven by an engine that may suffer uncontained engine failure, where said uncontained failure may throw debris into the projection area;
- some lines connecting the pump to the rest of the hydraulic circuit are partially installed within the protection zone, said lines comprising:
  - one or more low-pressure hydraulic fluid suction lines in which hydraulic fluid flows amongst others from a hydraulic tank towards the pump, the suction line or lines each comprising a cut-out valve that in the open position lets fluid circulate in the line and in the closed position stops the fluid circulation in the line under consideration;

one or more high pressure discharge lines, referred to as HP discharge, in which the hydraulic fluid flows from the pump to the rest of the hydraulic circuit, the discharge line or lines each comprising a check valve installed so as to prevent hydraulic fluid from flowing in the affected discharge line towards the pump;

where applicable, one or several low-pressure hydraulic fluid drain lines in which hydraulic fluid flows from a pump sump to the tank, the drain line or lines each comprising a check valve installed to prevent hydraulic fluid flowing in the affected drain line from the tank to the pump sump.

To prevent an uncontained engine failure that damages lines, suction lines and or HP discharge lines and or, as applicable, drain lines, close to a pump from making the hydraulic circuit to which the pump is connected unusable because of the hydraulic leak caused by the damage to the lines, the suction line or lines and or HP discharge line or lines and or, as applicable, drain line or lines each comprise at least one pressure sensor, each pressure sensor being installed between the pump and the cut-out valve or the check valve of the line in question and the hydraulic system comprises a cut-out valve control system that:

receives from the pressure sensors in each line, suction lines, discharge lines and drain lines, the distinctive measured pressure signal;

compares each distinctive measured pressure signal to a threshold predefined for each line;

issues an FVCF cut-out valve close command signal when at least one of the distinctive measured pressure signals is below the threshold to which it is compared.

To avoid triggering the cut-out valve closure unjustifiably because of a pressure change in the suction line that is subject to large pressure variations in normal use, the cut-out valve control system inhibits the FVCF cut-out valve close command signal when the pressure measured in the suction line is below the threshold value predefined for the said suction line if a distinctive signal indicating the hydraulic fluid level in the tank does not show that said level is below a predefined minimum level, called tank low level.

To take into account low-level leaks that do not cause pressure in the lines to fall below the predefined levels, i.e. sufficient to be interpreted as damage to a line, the cut-out valve control system:

issues an FVCF cut-out valve close command signal when none of the line pressures is measured as below the predefined thresholds but a tank low level signal is received and a signal identifying an uncontained engine failure is received from an uncontained engine failure detection system.

To prevent specific conditions from causing the cut-out valve control system to issue a reopen cut-out valve or valves signal when these valves have been closed, the close signal issued by the cut-out valve control system is locked when a hydraulic fluid low level signal is also received from the uncontained engine failure detection system stating that an uncontained failure has been detected.

To consolidate the conditions that trigger the closing of the cut-out valve, preferably the pressure in a line is determined using two pressure sensors and the pressure in a given line is deemed as being below the threshold defined for that line if at least one of the two sensors associated to said line delivers a distinctive signal indicating a pressure below the related threshold measurement validity signals from both sensors indicate that neither of the two sensors is able to transmit a reliable measurement.

For similar reasons, the hydraulic fluid tank low level is consolidated by:

comparing a value QB of the fluid level in the tank, measured by a level sensor, against the SQB threshold and by combining the result of this comparison with a QMIN tank minimum level detector using a logical AND when the value sent by the level sensor is deemed reliable because of the value of a validity signal associated to said level sensor, or;

by using solely the QMIN minimum level sensor value when the value sent by the level sensor is deemed not reliable because of the value of a validity signal associated to said level sensor.

So as not to impede the hydraulic systems start-up when the engines are started from a stopped state, the cut-out valve control system inhibits the FVCF cut-out valve close signal if the said cut-out valve was not closed because of a suspected or confirmed uncontained engine failure, when the aircraft is not in flight and or when the pump has been depressurized via a deliberate CDP depressurization command.

Advantageously, the cut-out valve control system considers that the aircraft is not in flight if the engines are not detected as running and the aircraft's speed is below a threshold speed that is lower than a minimum flight speed.

For safety reasons and to prevent the cut-out valve from being opened without the required aircraft repair operations having been carried out, the cut-out valve control system is able to issue an OVCF cut-out valve open signal and, when the conditions for closing the cut-out valve were carried out in flight, authorizes said OVCF signal to be issued only when all the aircraft's engines have been detected as stopped, when the aircraft is on the ground and when the level of hydraulic fluid in the tank is above the low level.

The disclosed embodiments also relate to a hydraulic system for aircraft comprising two independent hydraulic circuits each of the said circuits comprising two hydraulic pumps and both pumps from a single circuit being driven by different propulsion engines of the aircraft, wherein each hydraulic pump is associated with a cut-out valve controlled according to logic complying with the logic previously described.

In this way, the hydraulic systems architecture is simplified in comparison with known architectures without affecting the hydraulic system's reliability.

BRIEF DESCRIPTION OF THE DRAWINGS

The process according to the disclosed embodiments is described by reference to figures that show schematically.

According to the disclosed embodiments a hydraulic system for aircraft comprises at least one hydraulic circuit supplied by at least two separate hydraulic pumps one of which at least comprises lines that are within an engine's debris projection area in the case of uncontained engine failure, in particular because of the fact that it is driven mechanically by said engine which requires the installation to be very close to said engine.

DETAILED DESCRIPTION

Figure 1:
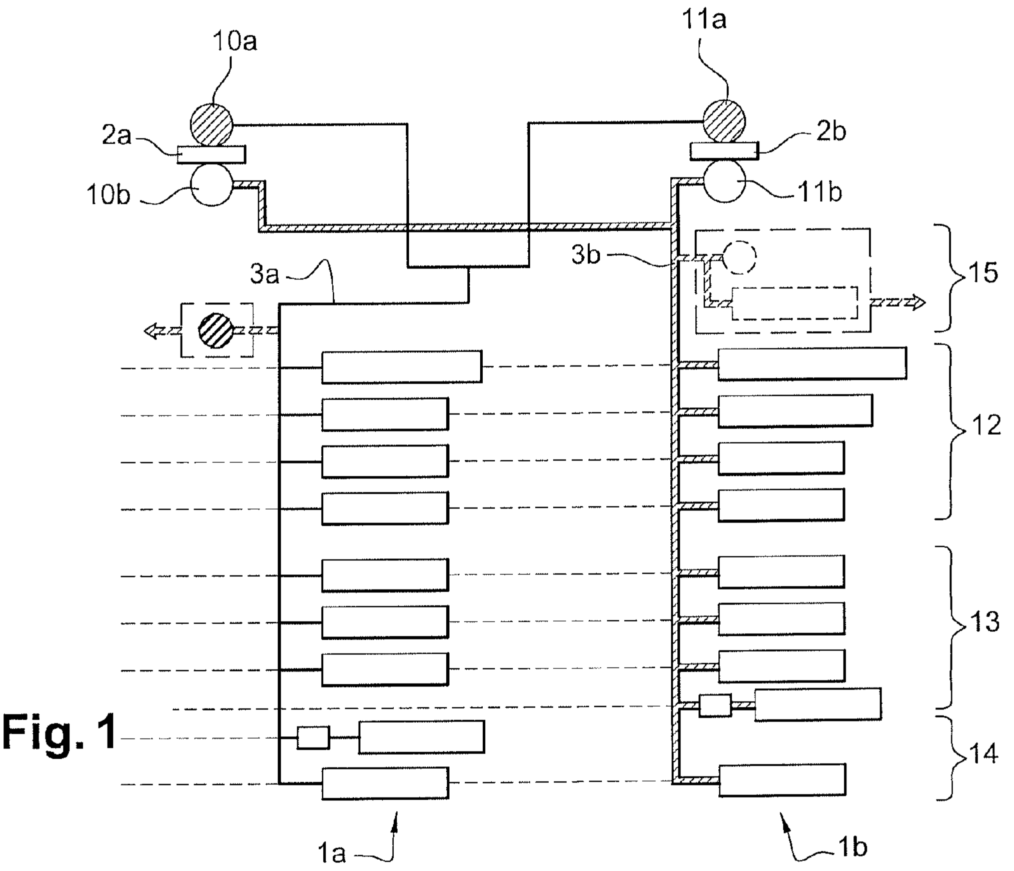
FIG. 1: a hydraulic systems architecture comprising two independent hydraulic circuits according to the disclosed embodiments.

FIG. 1 shows an example of an aircraft hydraulic systems architecture matching such a situation.

The hydraulic installation in FIG. 1 comprises two independent hydraulic circuits 1*a*, referred to as green circuit, and 1*b*, referred to as yellow circuit.

Said two green and yellow circuits are very similar from a functional point of view.

Each circuit 1*a*, 1*b* comprises two hydraulic pumps 10*a*, 11*a* and 10*b*, 11*b* respectively each driven by different propulsion engines 2*a* and 2*b* on the aircraft such that if an engine, 2*a*, 2*b* respectively, stops driving pumps 10*a* and 10*b*, 11*a* and 11*b* respectively to which they are connected, for instance because the rotation in one engine stops, both hydraulic circuits remain operational because they are supplied by pumps 11*a*, 11*b* 10*a*, 10*b* respectively connected to the other engine 2*b*, 2*a* respectively.

Each hydraulic circuit comprises hydraulic distribution lines in which hydraulic fluid circulates in a closed circuit, represented schematically in FIG. 1 by a single line 3*a*, 3*b* that supply hydraulic power to the consuming units, actuators, hydraulic motors, etc. e.g. those required for flight commands 12, flap mechanisms and engine thrust reversers 13 and landing gear systems 14.

A hydraulic circuit may comprise, as applicable, auxiliary hydraulic power generation means 15 for maintenance purposes.

Each circuit also comprises at least one hydraulic tank, not shown, a pressurized tank containing a reserve of hydraulic fluid.

The tank allows hydraulic fluid loss due to micro-leaks unavoidable in a hydraulic system to be compensated for and to compensate for variations in the fluid level caused by the operation of the devices and by operating temperature variations that are a cause of variations in the liquid's volume.

The tank is therefore an essential part of a hydraulic circuit and in particular its volume that defines the capacity of the tank to compensate for hydraulic fluid losses.

The tank comprises at least one Qb hydraulic fluid level sensor in the tank and preferably a specific Qmin low hydraulic fluid level sensor, said Qmin low level being deduced where applicable from measuring the Qb fluid level.

Figure 2:
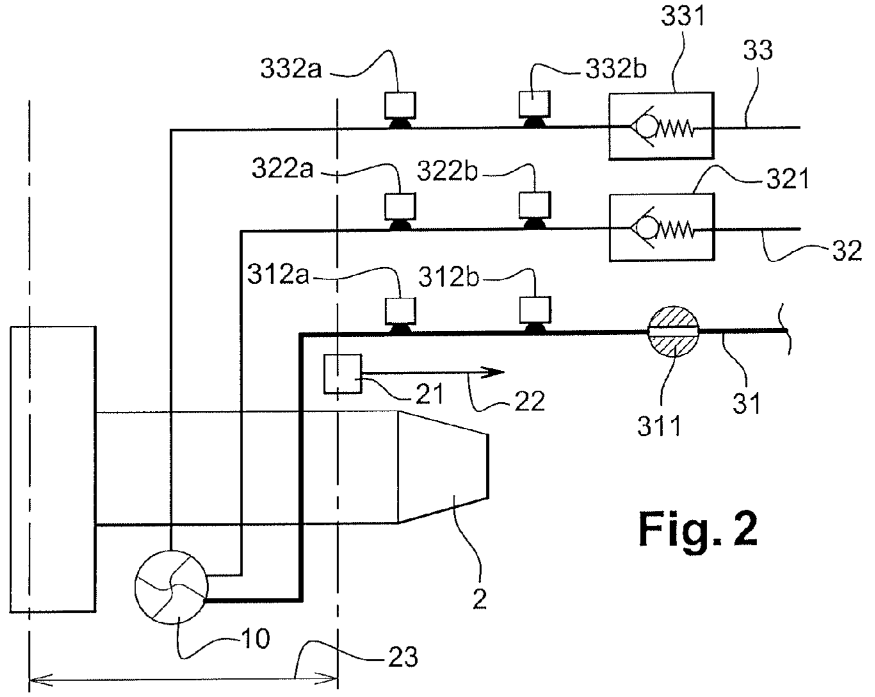
FIG. 2: a block diagram of the means of the disclosed embodiments near a hydraulic pump driven by a propulsion engine.

FIG. 2 shows schematically the location of a hydraulic circuit's hydraulic generator at the level of a propulsion engine 2 that corresponds to one of the engines 2*a*, 2*b* of FIG. 1.

Engine 2 drives a pump 10 mechanically, corresponding to a pump 10*a* or 10*b* or 11*a* or 11*b* in FIG. 1 depending on the engine and the hydraulic circuit in question (green or yellow).

Engine 2 also comprises an uncontained engine failure detection system that issues a specific information signal when an uncontained failure is detected using a communication line 22 as a data bus.

Such a system 21 is advantageously an engine operation control system, referred to as FADEC, in which is incorporated by known means the uncontained engine failure by analyzing signals from various engine sensors, not shown.

Pump 10 is connected to the hydraulic circuit by lines in which the hydraulic fluid flows towards the pump and lines in which the hydraulic fluid flows away from the pump.

In the example in FIG. 2, the pump comprises, according to a known pump architecture, three lines.

The first line 31, referred to as suction, corresponds to the intake of low-pressure hydraulic fluid towards pump 10, said fluid arriving from consuming devices and or the tank.

A second line, referred to as drain, relates to a low-pressure hydraulic fluid outlet from a draining sump on pump 10. The drain line sends to the tank the hydraulic fluid that arrives into pump 10's sump because of leaks internal to said pump.

A third line 33, referred to as HP discharge, relates to a high pressure hydraulic fluid outlet from pump 10, towards consuming devices.

In known manner suction line 31 comprises at least one isolation valve 311, referred to as cut-out valve, comprising a first position, referred to as open position, in which the hydraulic fluid circulates freely in the related line, and a second position, referred to as closed position, in which the hydraulic fluid can no longer circulate between a downstream part, pump side of the valve, and an upstream part, hydraulic circuit and consuming devices side, of the line.

If the pump comprises two or more suction lines, a case not shown in the figures, in the same manner, each line is fitted with at least one isolation valve. In the remainder of the description, the expression "the cut-out valve" must be read as "the cut-out valves associated with the pump's suction lines" whenever said pump comprises more than one suction line.

Also in known manner each of the drain 32 and HP discharge 33 lines is fitted with at least one check valve 321, 331 respectively, each check valve being installed on the related line such that the hydraulic fluid circulates freely in the line from pump 10 towards the hydraulic circuit and cannot circulate in the opposite direction, i.e. towards the pump.

If the pump comprises two or several drain or HP discharge lines, a case not shown in the figures, in the same way each line is fitted with at least one check valve.

The check valves are simpler than the cut-out valves as they require no command and are very reliable because of their build. They are adequate to prevent the return of hydraulic fluid towards the pump without restricting the passage of the fluid in the line in normal operation. Although they are preferred, the check valves can be replaced by or supplemented with controlled valves to carry out the same function as the check valves. In such an installation, said valves are controlled simultaneously with the suction line cut-out valve or valves.

Each line 31, 32, 33 is also fitted, between pump 10 on the one hand and cut-out valve 311 or check valves 321, 331 on the other, with at least one pressure sensor 312*a*, 312*b*, 322*a*, 322*b* respectively and 332*a*, 332*b*, that delivers a reading of the hydraulic fluid pressure in the related line.

The cut-out valves 311, check valves 321, 331 and pressure sensors 312*a*, 312*b*, 322*a*, 322*b*, 332*a*, 332*b*, are preferably installed on the lines in areas outside of a zone 23, referred to as projection area, in which engine debris that could damage hydraulic lines 31, 32, 33 may be projected such that said sensors, said valve and said check valves cannot be damaged by projected debris to reduce this risk as much as possible. Sensors, valves and check valves are installed in an engine 2 pylon area for instance.

Advantageously, the pressure sensors are installed as close as possible to area 23 so as to be as sensitive as possible to variations in hydraulic fluid pressure in the portions of lines located within said area.

In addition, a control system for cut-out valve 311 receives signals from the pressure sensors installed on the lines such that when the pressures measured by the sensors are lower than thresholds tailored to each line, said control system issues a signal that requests the closing of said cut-out valve.

Because of the quasi-instant nature of the pressure measurements supplied by the pressure sensors installed on the lines and of the rapid pressure drop in a line that would be caused by said line being severed, the detection of a pressure drop by a sensor below the threshold related to said sensor is interpreted by the cut-out valve control system as a leak in the corresponding line possibly due do an uncontained engine failure and said system requests the closing of cut-out valve 311 on suction line 31 of pump 10 driven by engine 2.

This closing of cut-out valve 311 is requested after a very short time, of the order of a few seconds at most, after detection of the pressure drop and therefore of the supposed uncontained failure, a much shorter time than that of the order of thirty seconds at the end of which the uncontained engine failure detection system 21 is able to signal the uncontained engine failure.

Pump 10 and the line elements that may have been damaged are then isolated from the rest of the hydraulic circuit, by cut-out valve 31 on the one hand and by check valves 32, 33 on the other, without a large quantity of hydraulic fluid having been lost and therefore keeping said hydraulic circuit in operation with the other pump in the circuit in question.

In a particular embodiment, when the means implemented to detect an uncontained engine failure are deemed as delivering sufficiently certain information, the cut-out valve control system also comprises logic that causes valve 31 associated with pump 10 when uncontained engine failure detection system 21 declares an uncontained failure of the engine on which said pump is mounted, even when none of the pressures measured by pressure sensors 312*a*, 312*b*, 322*a*, 322*b*, 332*a*, 332*b* is below the thresholds.

It is effectively possible in this case that the uncontained engine failure caused limited leaks that did not cause the pressures measured by the pressure sensors to drop below the thresholds at which the system requests the closing of cut-out valve 311. In this case, the loss of hydraulic fluid remains limited in spite of the uncontained engine failure detection time by the uncontained failure detection system 21.

The tank also comprises at least one Qb hydraulic fluid level sensor in said tank that delivers a signal specifying said fluid level.

Preferably, the tank also comprises a low level detector that issues a signal that changes state when the level of fluid inside the tank drops below a predefined level.

It must be noted that even absent a leak, when the uncontained engine failure is confirmed, it is desirable to isolate pump 10 when engine 2 suffered an uncontained failure because the unbalance of an engine following an uncontained failure is generally large and the risk of damage occurring to hydraulic lines is high because of the high level of vibrations present.

Advantageously the cut-out valve control system receives signals to inhibit the cut-out valve 311 closure command when the pressures measured by pressure sensors 312*a*, 312*b*, 322*a*, 322*b*, 332*a*, 332*b* are normally below the threshold values, in particular during the starting phases of engine 2.

For instance the cut-out valve control system logic inhibits the closure of cut-out valve 311 when the aircraft's speed is below a given speed, e.g. a speed of 100 Kt for a civilian aircraft, implying the aircraft is not in flight.

In a preferred embodiment of the disclosed embodiments the pressure condition, for which it is considered by the cut-out valve control system that a line 31, 32, 33 is damaged, is established by means of a first pressure measurement sensor 312*a*, 322*a* and 332*a* respectively, and of a second sensor 312*a*, 322*b* and 332*b* respectively, in said line, each sensor delivering a value of fluid pressure measured in the related line on the one hand, and a validity signal that specifies the reliability of the information delivered by the sensor on the other.

The pressure value delivered by a sensor may be an analog or digital value corresponding to a measured value and that is then compared by the cut-out valve control system to the threshold value associated with said sensor or, by design of said sensor a discrete value that changes state for the threshold value.

In a preferred embodiment using two pressure sensors per line, the cut-out valve control system determines that the pressure is below the predefined threshold:

- if the first sensor delivering a valid signal given the value of the related validity signal returns a pressure value lower than the predefined threshold for this sensor, and or;
- if the second sensor delivering a valid signal given the value of the related validity signal returns a pressure value lower than the predefined threshold for this sensor, or;
- if the first and second sensors are declared as not returning valid information given their validity signals, a condition which leads to the supposition that both sensors are damaged.

When the detection of an uncontained engine failure is not confirmed within the given time required by uncontained engine failure detection system 21 to deliver the uncontained failure information, say a thirty second period, it is assumed that closing cut-out valve 311 is not justified and the cut-out valve 311 control system requests the reopening of said valve to achieve a return to nominal operation for the pump.

In contrast, if the uncontained engine failure detection is confirmed within the given timeframe required by uncontained engine failure detection system 21 to deliver the uncontained failure information, closing cut-out valve 311 is justified and the cut-out valve 311 control system locks the close request for said valve such that reopening of said valve becomes impossible until conditions have been achieved corresponding to the circuit having been repaired while the aircraft is on the ground.

Figure 3:
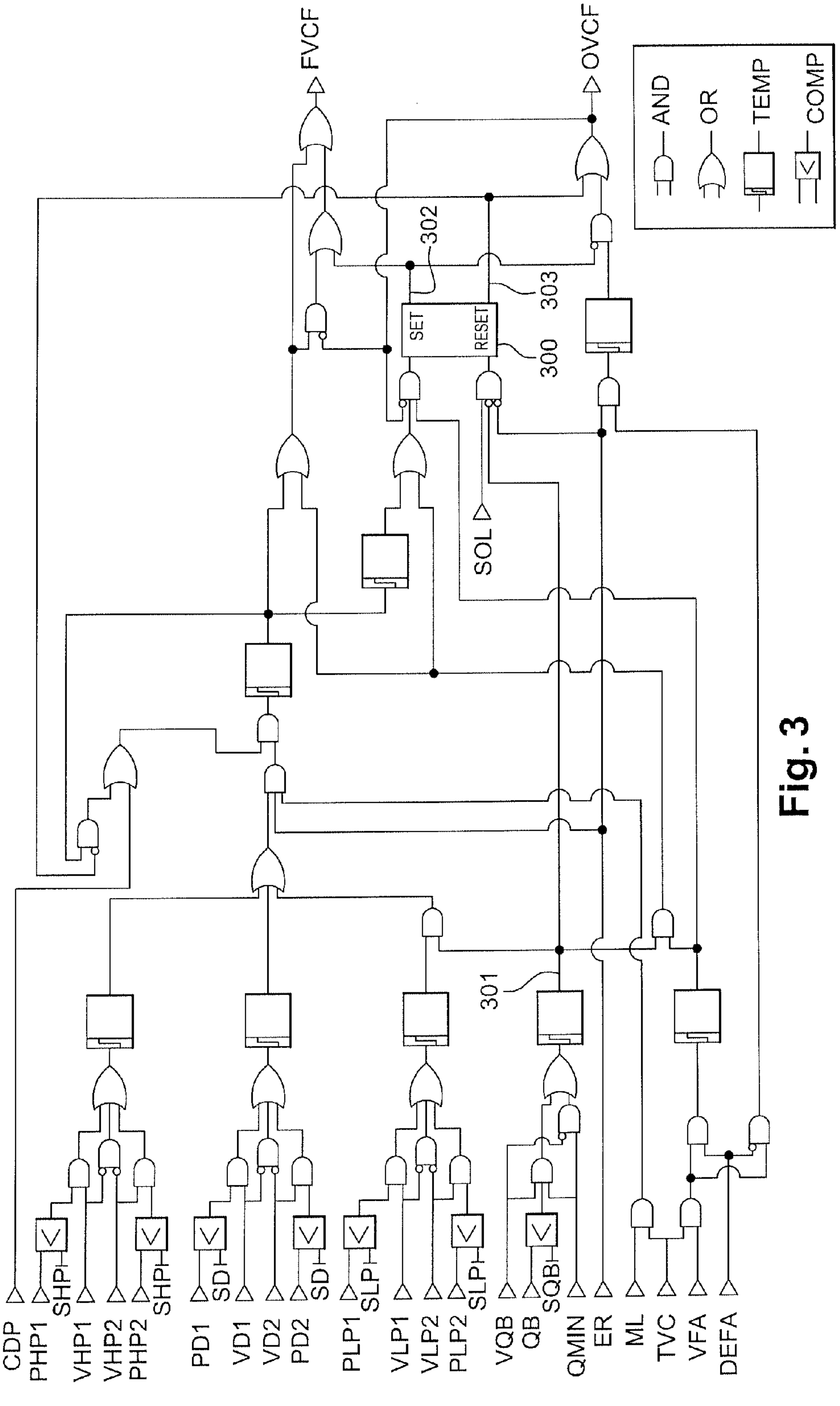
FIG. 3: the control logic for a cut-out valve associated with a hydraulic pump.

A detailed example of the operating logic of the cut-out valve control system for a pump 10 installed as per FIG. 2 according to the disclosed embodiments is shown in FIG. 3. Each pump driven by an engine that may project debris, whatever the nature of the circuit supplied with hydraulic pressure by said pump, preferably comprises a similar cut-out valve control system or, where applicable, of several cut-out valves linked to the pump in question if several valves are used.

This FIG. 3 shows a diagram that uses generally accepted principles for representing logic diagrams using AND logic gates and OR logic gates, related or not to inverted entries, as well as DELAY (TEMP) and COMPARE (COMP).

In FIG. 3 the input and output signals have the following meanings:

for the input signals:

| | |
|---|---|
| PHP1 | Pressure measured by first HP Discharge sensor 332a |
| PHP2 | Pressure measured by second HP Discharge sensor 332b |
| VHP1 | Validity signal for first HP Discharge sensor 332a |
| VHP2 | Validity signal for second HP Discharge sensor 332b |
| SHP | HP discharge pressure lower threshold value |
| PD1 | Pressure measured by first Drain sensor 332a |
| PD2 | Pressure measured by second Drain sensor 332b |
| VD1 | Validity signal for first Drain sensor 332a |

-continued

| | |
|---|---|
| VD2 | Validity signal for second Drain sensor 332b |
| SD | Drain pressure lower threshold value |
| PLP1 | Pressure measured by first Suction sensor 312a |
| PLP2 | Pressure measured by second Suction sensor 312b |
| VLP1 | Validity signal for first Suction sensor 312a |
| VLP2 | Validity signal for second Suction sensor 312b |
| SLP | Suction pressure lower threshold value |
| QB | Hydraulic fluid quantity measured in the tank |
| SQB | Quantity lower threshold value QB |
| VQB | QB signal validity signal |
| QMIN | Low hydraulic fluid level in tank detection signal |
| CDP | Pump depressurization request signal |
| ER | Engine operating detection signal |
| ML | Engine fuel supply open signal |
| TVC | Aircraft speed above threshold speed signal |
| DEFA | Uncontained engine failure detection signal issued by the FADEC |
| VFA | DEFA signal validity signal |
| SOL | Aircraft on the ground detection signal |

for the output signals:

| | |
|---|---|
| FVCF | Cut-out valve close command signal |
| OVCF | Cut-out valve open command signal |

According to the proposed logic, as shown by examination of the schematic in FIG. 3, for signals comprising two logic states (1/0) or (True/False) a signal takes the logical value 1 or True when the condition given in the definition is realized.

The schematic can be transposed without difficulty if some input signals do not comply with this principle and the logic is not strictly limited to the proposed schematic, in particular additional cut-out valve open or close command triggering or inhibiting conditions may be introduced for the safe operation of the system for instance.

The operation of the disclosed embodiments in the case of the specific logic example proposed in FIG. 3 is detailed below.

In nominal conditions, the aircraft is in flight and the engines operating normally:

- The hydraulic fluid level in the tank of the hydraulic circuit under consideration is deemed to be above the minimum level, referred to as low level, i.e. the measured quantity of fluid QB is greater than the low threshold SQB and the low level detection signal has the logical value 0;
- the engine is supplied with fuel and the ML signal has the logical value 1;
- the hydraulic pump of the hydraulic circuit under consideration is under pressure and the CDP signal has the logical value 0;
- The FADEC engine control and monitoring computer issues an ER signal with logical value 1 to signify that the engine is operating correctly
- uncontained engine failure system 21, the FADEC computer in the example in question, delivers a DEFA signal with logical value 0, no uncontained engine failure having been detected.

In the case of nominal operation it is also assumed that the validity signals, whose task is to prevent a signal sent by a failing device from being taken into account, all have the logical value 1, i.e. the signals sent by the devices are taken as valid.

During the transition engine start-up phase the pressures, measured by pressure sensors 312*a*, 312*b*, 322*a*, 322*b*, 332*a*, 332*b*, are established progressively from values lower than the threshold values SHP, SD and SLP respectively for the three HP discharge, drain and suction lines.

During this transition phase the FVCF close cut-out valve 311 command is therefore locked out and said cut-out valve is kept open, FVCF has the logical value 0 and OVCF has the logical value 1.

During take-off the aircraft speed increases and when the speed reaches a threshold speed, said threshold speed having been selected as lower than the minimum flight speed for the aircraft in question, say a speed of 100 knots for a modern civilian transport aircraft, it becomes possible to close cut-out valve 311.

During flight, in normal flight conditions, cut-out valve 311 is open and the logic is able to request closing of said valve.

In case of uncontained engine failure, projected debris may damage one of the discharge and or drain and or suction lines, such damage possibly causing a significant leak, in particular in case of a severed line, i.e. rapid loss of hydraulic fluid with regard to the time required by uncontained engine failure detection system 21 to identify the uncontained failure.

Damages can also be more limited, for instance by partially piercing a line, and cause a leak through which the loss of hydraulic fluid is slow with regards to the time required by uncontained engine failure detection system 21 to identify the uncontained failure.

If no line was damaged during the uncontained engine failure, no leak occurs and in this case there will apparently be neither a drop in the measured pressure of the fluid in the lines nor a drop of fluid level in the tank.

Case of a Significant Leak:

When a significant leak occurs on HP discharge line 33, the pressure in said HP discharge line drops and values PHP1 and PHP2 measured by discharge pressure sensors 322*a* and 322*b* drop below the SHP threshold value causing the closing of cut-out valve 311 because the closing logic is active in view of the other activation conditions.

Check valves 321, 331 prevent hydraulic fluid flow towards pump 10 which is no longer supplied with fluid.

In the same way when a significant leak occurs on drain line 32, the pressure in said drain line drops and values PD1 and PD2 measured by drain pressure sensors 322*a* and 322B drop below the SD threshold value thus causing the closing of cut-out valve 311 to be activated.

In the same way when a significant leak occurs on suction line 31, the pressure in said suction line, usually maintained by the tank, drops and values PLP1 and PLP2 measured by suction pressure sensors 312*a* and 312B drop below the SLP threshold value thus causing the closing of cut-out valve 311 to be activated.

However, in this last case, due to the relatively low pressures in suction line 31, generally a few bar, and to the relatively large variations in said pressure in normal operation, either because of the level of fluid in the tank, or because of the loss of loading in the circuit during a heavy flow request by hydraulic consumers, it is advantageous to consolidate the detection of a pressure drop in suction line 31 with a signal 301 referred to as tank low level, which is at logical value 1 when the hydraulic fluid level in the tank is below a set threshold.

In a preferred embodiment of the logic, signal 301 signifying low level in the accumulator is itself consolidated by a combination of a hydraulic fluid level measurement QB in the accumulator compared with a predefined threshold SQB and a low level detected signal QMIN, said QMIN signal switching to logical state 1 when the level of fluid in the accumulator falls below a given level, advantageously the level corresponding with the SQB threshold or related level.

Consolidating the measurement of the pressure drop in suction line 31 with the detection of low level in the tank prevents triggering an FVCF close cut-out valve 311 command because of normal pressure variations in the hydraulic circuit whereas in the case of a significant leak, the pressure drop in the suction line and the detection of the low level occur quickly after the start of the leak.

In the logic proposed in FIG. 3, each of the pressure sensors 312*a*, 312*b* or 322*a*, 322*b* or 332*a*, 332*b* positioned on the same line, respectively 31 or 32 or 33, is sufficient to deliver a pressure drop signal subject to its related validity signal having logical value 1.

When the validity signal from both sensors on a same line have a logical value of 0, i.e. the pressure values sent by said sensors are not reliable, it is assumed that the sensors are damaged, for instance in the case of an uncontained engine failure, and that the corresponding line is also likely to have been damaged.

Therefore the logic used considers that the non-validity of both sensors on the same line is equivalent to a pressure drop in said line.

Detection of a pressure drop is preferably subjected to a time delay for each line so as not to cause the spurious closing of cut-out valve 311 because of a transitory signal that could result from normal operation of the hydraulic system.

Case of a Slow Leak:

When the hydraulic fluid leak is slow, which results in the case of an uncontained engine failure for instance from limited damage to a line 31, 32, 33 by a piece of debris or loosening of a joint due to the strong vibrations caused by the unbalance of rotating parts of engine 2, the hydraulic system remains operational as long as there remains hydraulic fluid in the tank to supply pump 10.

In this case, whichever line has failed, the level of fluid in the tank drops sufficiently slowly for uncontained engine failure detection system 21 to establish the uncontained engine failure diagnosis within a known time period, in general of the order of 30 seconds.

When the DEFA signal issued by uncontained engine failure detection system 21, the FADEC in the given example, switches to logical value 1 and when the tank fluid level monitoring causes a 301 consolidated low level signal, as for the case examined during a significant leak on suction line 31, the command to close cut-out valve 311 is issued.

It must be noted that in this case cut-out valve 311 is not closed absent an uncontained engine failure signal, i.e. if DEFA still has logical value 0, even when low level in the tank is detected. Effectively in this situation, nothing leads to the supposition that the putative leak is located between pump 10 and cut-out valve 311 or check valves 321, 331 and consequently closing said cut-out valve would have no effect on the leak and would deprive the circuit of the energy supplied by pump 10.

To be completely operational, the hydraulic system logic that isolates pump 10 by closing the cut-out valve must take additional constraints into consideration the main ones of which follow:

A first constraint relates to the controlled depressurization of pump 10.

Deliberate depressurization of pumps and hydraulic circuits is possible by the actions of a pilot of the aircraft in the cockpit that has the effect of changing the CDP variable to logical value 0.

In this case the pressure in the discharge 33 and drain 32 lines drops normally and the cut-out valve 311 closing logic excluding expected tank low level detection cases is inhibited.

In contrast, once the logic has been activated and cut-out valve 311 is closed, the CDP signal is no longer taken into account whatever action the pilot may take that would change this variable. This logical lock 300 of output 302 from a logical flip-flop cannot be opened in flight because it requires that the ground condition established by variable SOL be at value 1 again, that the engines be stopped which corresponds to the ER variable having logical value 0 and that the pressure in the lines be restored to activate the unlocking function via output 303 of the logical flip-flop.

When the logic has been activated, the closing of cut-out valve 311 must be maintained, in particular when it has been activated by the low level parameter, which is the case for a slow leak but also in the case of a ruptured suction line 31, because in both cases, the fluid level in the tank rises due to the fact that pump 10 of failed engine 2 is still driven and generally pushes hydraulic fluid back into the tank, particularly the fluid between pump 10 and check valve 333 of discharge line 33, but also that aspirated by pump 10 in suction line 31.

Locking of output 302 is achieved when the conditions for activating the closing of the cut-out valve are satisfied and the DEFA signal from the uncontained engine failure detection system is also present.

When the logic has been activated and locked, it cannot be unlocked while the conditions for unlocking on the ground have not been satisfied.

When the cut-out valve closing logic which has been activated on the basis of a pressure loss measurement in one of the lines is not confirmed by the signal from uncontained engine failure detection system 21, the activation conditions remain in force for cases triggered by low pressure measurements on discharge line 33 or drain line 32, supported by the closure of cut-out valve 311 and consequently by a lack of hydraulic fluid in said lines, and the logic remains activated, i.e. that the closing condition of said valve is not locked.

When the cut-out valve logic is triggered by the rupture of suction line 31 or in a slow leak scenario, logic that uses the measurement of the hydraulic fluid in the tank, and when the fluid level in the tank rises again above the low level threshold for the reasons explained above, cut-out valve 311 is opened again.

The leak, that still exists, then causes the level of the hydraulic fluid in the tank to fall again and when said level reached the low level, the cut-out valve closing logic is again activated, this time definitively as the level then remains below the SQB threshold value.

In practice, the choice of said threshold value SQB or QMIN comes from this failure scenario, the volume of hydraulic fluid then remaining in the tank once this level is reached being required to sustain satisfactory operation of the hydraulic circuit supplied with hydraulic pressure by the other pump in said circuit driven by another engine.

If the cut-out valve closing logic detects a pressure drop in one or several of the three lines 31, 32, 33 of pump 10 and if after a delay 304 the input signals TVC, ER and DEFA indicate that the aircraft is in flight and that engine 2 is operational then logical lock 300 is not set and the FVCF cut-out valve 31 close command is inhibited.

This logic processes cases that do not correspond to an uncontained engine failure because there is no external leak or uncontained engine failure detected, but corresponds instead to an unidentified cause, for instance a cause linked to pump 10 itself.

When the cut-out valve 311 closing logic and output 302 of logical lock 300 have been activated, unlocking is necessary after repair and recommissioning of the circuit, on the ground obviously.

When signals ER and SOL establish that the aircraft is in effect on the ground with engines stopped and when the low hydraulic fluid level in the tank condition no longer exists, following the restoration of the circuit, output 303 of logical lock 300 authorizes the reopening of cut-out valve 311 previously closed and locked by locking signal 302.

The logic that isolated a leak following the uncontained failure of an engine, the hydraulic circuit in question, that has at least one other pump driven by at least one other engine, for instance a propulsion engine on the opposite wing, remains operational because of the fact that said other pump is operating. The engine that suffered the uncontained failure is identified by its specific pressure signals and in the case of a slow leak, even if the tank is common to two or more pumps comprising cut-out valves controlled by logic equivalent to that just described, the signal from uncontained engine failure detection system determines unambiguously the failing engine on which the cut-out valve must be closed.

The hydraulic devices supplied by said hydraulic circuit are preferably positioned outside of the probable trajectories of debris or, in the opposite case, fitted with isolation fuses.

The apparatus described in detail for a hydraulic circuit in a particular embodiment allows the construction of a redundant aircraft hydraulic systems architecture such as that shown in FIG. 1 comprising two independent hydraulic circuits, green circuit 1*a* and yellow circuit 1*b*, each circuit comprising two pumps 10*a*, 11*a* 10*b*, 11*a* respectively, each driven by a different engine 2*a*, 2*b* of an aircraft comprising at least two propulsion engines.

In this architecture, uncontained failure of an engine 2*a*, 2*b* may cause leaks on the two green 1*a* and yellow 1*b* hydraulic circuits at the level of the two pumps 10*a*, 10*b* or 11*a*, 11*b* driven by the engine 2*a* or 2*b* respectively in question that has suffered an uncontained failure.

The hydraulic system using, preferably on both hydraulic circuits 1*a*, 1*b* and on both pumps 10*a*, 10*b*, 11*a*, 11*b* respectively, of each circuit, the closing logic of each cut-out valve associated to each pump in accordance with the disclosed embodiments will achieve the isolation of the damaged lines and both hydraulic circuits 1*a*, 1*b* will remain operational using the pumps driven by the other engine, as they have hydraulic fluid in sufficient quantity to ensure the correct operation of said hydraulic circuits.

The invention claimed is:

1. An aircraft hydraulic system comprising:

two independent hydraulic circuits, with each of said circuits being supplied by at least two pumps respectively, wherein each of said pumps associated with a same one of said circuits is driven by a different propulsion engine, and further wherein one of said two independent hydraulic circuits supplies hydraulic power to a set of consuming units, and the other of said two independent hydraulic circuit supplies hydraulic power to the same set of consuming units;

wherein for each of said independent circuits:

at least one pump, amongst said at least two pumps, is driven by one of the propulsion engines that may suffer an uncontained engine failure, which uncontained engine failure may project debris into a projection area;

connecting lines from the at least one pump to the rest of the at least one hydraulic circuit are installed in part in the projection area, said lines comprising:

at least one low pressure hydraulic fluid suction line in which the hydraulic fluid flows from a hydraulic tank towards the at least one pump, said at least one suction line comprising a cut-out valve which in the open position lets the fluid circulate in said suction line and in the closed position prevents the fluid from circulating in said suction line;

at least one high pressure hydraulic fluid discharge line, referred to as HP discharge line, in which the hydraulic fluid flows from the pump towards the rest of the hydraulic circuit, said at least one HP discharge line comprising a check valve installed to prevent hydraulic fluid from circulating in said HP discharge line towards the pump;

and further wherein the at least one suction line and the at least one HP discharge line each comprise at least one pressure sensor respectively, able to deliver a signal characteristic of a hydraulic fluid pressure value in the line under consideration between the pump and the cut-out valve, respectively between the pump and the check valve, and wherein the hydraulic circuit comprises a control system for the cut-out valve that:

receives from the at least one pressure sensor in each line, suction line and HP discharge line, the distinctive measured pressure signal;

compares each distinctive measured pressure signal to a threshold predefined for each line;

issues a close cut-out valve command signal to close the cut-out valve when at least one of the distinctive measured pressure signals is below the threshold to which it has been compared.

2. The hydraulic system according to claim 1 wherein the connection lines from the pump to the rest of the hydraulic circuit, installed in part in the projection area, comprise at least one low pressure hydraulic fluid drain line in which hydraulic fluid flows from a pump sump towards the tank, said drain line comprising a check valve installed to stop hydraulic fluid flowing in said drain line from the tank to the pump sump and comprising at least one pressure sensor able to deliver a distinctive hydraulic pressure value signal in the line under consideration between the pump and the check valve, and wherein the cut-out valve control system receives the distinctive drain line fluid pressure signal and issues the cut-out valve close command when said measured pressure is below a threshold.

3. The hydraulic system according to claim 1 wherein the cut-out valve control system inhibits the cut-out valve close command when the pressure as measured on the suction line is below the predefined threshold for said suction line if a signal distinctive of a hydraulic fluid level in the tank does not indicate that said fluid level in the tank is below a predefined minimum level, referred to as tank low level.

4. The hydraulic system according to claim 3 wherein the cut-out valve control system:

issues a cut-out valve close signal when none of the pressures in the suction line, the HP discharge line and where applicable drain lines are measured as below the predefined thresholds but when a tank low level signal has been received and;

a signal identifying an uncontained engine failure has been received from an uncontained engine failure detection system.

5. The hydraulic system according to claim 4 wherein the cut-out valve close command is locked in the valve closed condition when the tank low hydraulic fluid level is received and an uncontained engine failure signal is received from the uncontained engine failure detection system.

6. The hydraulic system according to claim 3 wherein the pressure in a line is determined by means of two pressure sensors, respectively, and in which the pressure in a given line is considered to be below the threshold defined for said line if:

at least one of the two sensors associated with said line delivers a signal distinctive of a pressure being below its corresponding threshold;

validity signals for the measurements supplied by the two sensors indicate that neither of the two sensors is able to transmit a reliable measurement.

7. The hydraulic system according to claim 3 wherein the low hydraulic fluid level in the tank is consolidated:

by comparing a fluid in tank level value QB, measured by a level sensor, with a threshold value SQB and by combining the result of this comparison with a QMIN signal from a minimum level sensor in the tank using a logical AND when the value transmitted by the level sensor is deemed reliable because of the value of a validity signal associated with said level sensor, or;

by using only the QMIN signal from the minimum level sensor when the value sent by the level sensor is deemed not reliable because of the value of a validity signal associated with said level sensor.

8. The hydraulic system according to claim 6 wherein the cut-out valve control system inhibits the cut-out valve or valves close signal, if said cut-out valve or valves were not closed because of a supposed or confirmed uncontained engine failure, when the aircraft is not in flight and/or a pump has been depressurized by a deliberate COP depressurization command.

9. The hydraulic system according to claim 8 wherein the cut-out valve control system is able to issue a cut-out valve open signal and only authorizes generation of said open signal, when the conditions for closing cut-out valve were satisfied in flight, when all the aircraft's engines are detected as stopped, the aircraft is detected as being on the ground and the hydraulic fluid level in the tank is above the low level.

10. An aircraft hydraulic system comprising at least one hydraulic circuit supplied by at least two pumps respectively, wherein:

at least one pump amongst said at least two pumps is driven by an engine that may suffer an uncontained engine failure, which uncontained engine failure may project debris into a projection area;

connecting lines from the at least one pump to the rest of the at least one hydraulic circuit area installed in part in the projection area, said lines comprising:

at least one low pressure hydraulic fluid suction line in which the hydraulic fluid flows from a hydraulic tank towards the at least one pump, said at least one suction line comprising a cut-out valve which in the open position lets the fluid circulate in said suction line and in the closed position prevents the fluid from circulating in said suction line;

at least one high pressure hydraulic fluid discharge line, referred to as HP discharge line, in which the hydraulic fluid flows from the pump towards the rest of the hydraulic circuit, said at least one HP discharge line comprising a check valve installed to prevent hydraulic fluid from circulating in said HP discharge line towards the pump;

wherein the at least one suction line and the at least one HP discharge line each comprise at least one pressure sensor respectively, able to deliver a signal characteristic of a hydraulic fluid pressure value in the line under consideration between the pump and the cut-out valve, respectively between the pump and the check valve, and wherein the hydraulic circuit comprises a control system for the cut-out valve that:

receives from the at least one pressure sensor in each line, suction line and HP discharge line, the distinctive measured pressure signal;

compares each distinctive measured pressure signal to a threshold predefined for each line;

issues a close cut-out valve command signal to close the cut-out valve when at least one of the distinctive measured pressure signals is below the threshold to which it has been compared; and wherein the cut-out valve control system inhibits the cut-out valve close command when the pressure as measured on the suction line is below the predefined threshold for said suction line if a signal distinctive of a hydraulic fluid level in the tank does not indicate that said fluid level in the tank is below a predefined minimum level, referred to as tank low level.

11. The hydraulic system according to claim 10 wherein the connection lines from the pump to the rest of the hydraulic circuit, installed in part in the projection area, comprise at least one low pressure hydraulic fluid drain line in which hydraulic fluid flows from a pump sump towards the tank, said drain line comprising a check valve installed to stop hydraulic fluid flowing in said drain line from the tank to the pump sump and comprising at least one pressure sensor able to deliver a distinctive hydraulic pressure value signal in the line under consideration between the pump and the check valve, and wherein the cut-out valve control system receives the distinctive drain line fluid pressure signal and issues the cut-out valve close command when said measured pressure is below a threshold.

12. The hydraulic system according to claim 10 wherein the cut-out valve control system:

issues a cut-out valve close signal when none of the pressures in the suction line, the HP discharge line and where applicable drain lines are measured as below the predefined thresholds but when a tank low level signal has been received and;

a signal identifying an uncontained engine failure has been received from an uncontained engine failure detection system.

13. The hydraulic system according to claim 12 wherein the cut-out valve close command is locked in the valve closed condition when the tank low hydraulic fluid level is received and an uncontained engine failure signal is received from the uncontained engine failure detection system.

14. The hydraulic system according to claim 10 wherein the pressure in a line is determined by means of two pressure sensors, respectively, and in which the pressure in a given line is considered to be below the threshold defined for said line if:

at least one of the two sensors associated with said line delivers a signal distinctive of a pressure being below its corresponding threshold;

validity signals for the measurements supplied by the two sensors indicate that neither of the two sensors is able to transmit a reliable measurement.

15. The hydraulic system according to claim 14 wherein the cut-out valve control system inhibits the cut-out valve or valves close signal, if said cut-out valve or valves were not closed because of a supposed or confirmed uncontained engine failure, when the aircraft is not in flight and/or a pump has been depressurized by a deliberate COP depressurization command.

16. The hydraulic system according to claim 10 wherein the low hydraulic fluid level in the tank is consolidated:

by comparing a fluid in tank level value QB, measured by a level sensor, with a threshold value SQB and by combining the result of this comparison with a QMIN signal from a minimum level sensor in the tank using a logical AND when the value transmitted by the level sensor is deemed reliable because of the value of a validity signal associated with said level sensor, or;

by using only the QMIN signal from the minimum level sensor when the value sent by the level sensor is deemed not reliable because of the value of a validity signal associated with said level sensor.

17. The hydraulic system according to claim 15 wherein the cut-out valve control system is able to issue a cut-out valve open signal and only authorizes generation of said open signal, when the conditions for closing cut-out valve were satisfied in flight, when all the aircraft's engines are detected as stopped, the aircraft is detected as being on the ground and the hydraulic fluid level in the tank is above the low level.

* * * * *